United States Patent [19]

Terase et al.

[11] 4,038,722

[45] Aug. 2, 1977

[54] METHOD FOR PROCESSING EUPHAUSIA SUPERBA

[75] Inventors: Tsuneo Terase; Ryuzo Onishi, both of Tokyo; Haruo Akazawa, Fuchu, all of Japan

[73] Assignees: Nichiro Gyogyo Kaisha Ltd., Tokyo; Taihei Shiryo Kaisha, Ltd.; Nippon Sanso K.K., Tokyo; Sintokogio, Ltd., all of Japan

[21] Appl. No.: 662,722

[22] Filed: Mar. 1, 1976

[30] Foreign Application Priority Data

Mar. 14, 1975 Japan .................................. 50-30181

[51] Int. Cl.$^2$ ............................................. A22C 29/00
[52] U.S. Cl. .......................................... 17/48; 17/73
[58] Field of Search ................... 17/48, 45, 50, 71, 72, 17/73; 426/480, 437, 479, 520, 524

[56] References Cited

U.S. PATENT DOCUMENTS

| 1,520,190 | 12/1924 | Lieberman | 17/71 |
|---|---|---|---|
| 3,094,487 | 6/1963 | Van Arsdell | 426/479 |
| 3,875,614 | 4/1975 | Lapeyre | 17/48 |

*Primary Examiner*—Robert Peshock

*Attorney, Agent, or Firm*—P. D. Golrick

[57] ABSTRACT

Method for processing *Euphausia superba*, a large-sized animal plankton of 15–50mm body length which is quite similar to the small shrimp, *Sergestes lucens*, in dimension, shape and taste. This method basically comprises applying, to a mass of fresh bodies of *Euphausia superba*, an appropriate force whereby from the head-chest portion of each body there may be readily expelled the internal organs, above all the liver of objectionable taste, leaving the desired meat of the tail-belly portion within the shell then subjecting the mass of the bodies of *Euphausia superba* so treated to the steps of heating in hot or boiling water to effect protein thermal coagulation in most of the proteins of the meat portion, removing the juices produced in a gap formed between the shell and the thermally shrunken meat portion, freezing quickly each separate body, without adherence to one another, to a temperature of about $-35°$ C, and subjecting the mass to pellet shooting and crushing, whereby the frozen and brittle shell, gill portion, eyes, feelers and legs of the plankton are distintegrated and made readily removable from the undamaged meat portion to isolate selectively a mass of the meat portions.

7 Claims, No Drawings

METHOD FOR PROCESSING EUPHAUSIA SUPERBA

The present invention relates to a method fo processing an animal plankton *Euphausia superba* occuring in the Antarctic Ocean to provide a useful and flavorful proteinaceous food product.

According to the zoological classification, said *Euphausia superba* belongs to Phylum Arthropoda, Class Crustacea, Legion Malacostraca, Order Euphausiacea, Family Euphausidae. It is a large-sized plankton of about 15-50mm body length, which resembles closely a small shrimp called *Sergestes lucens* in dimension and shape as well as in the taste of the meat portion. The population of *Euphausia superba*, the principal food of whales, is estimated to total 1-1.5 billion tons in said ocean.

Since *Euphausia superba* can grow so fast that it completely matures in only two years, it is estimated that even if 50-70 million tons of *Euphausia superba* should be caught a year, which corresponds very nearly to the yearly total fishing catch in the world, there would be no adverse effect on the reproduction thereof. In view of the fact that this is the sole great source of animal protein now potential available for human beings throughout the world, it has been urgently desired in these recent years to develop a method for processing this plankton to provide a proteinaceous foodstuff.

In some countries inclusive of Japan, *Euphausia superba* has tentatively been caught and marketed as sea food. According to the conventional processing method, a fresh and raw mass of *Euphausia superba* caught in the Antarctic Ocean is boiled with sea water and then frozen on board. The frozen product transported from the fishing ground is thawed and then dried.

The dried product is used for food in substantially the same ways as the small shrimp *Sergestes lucens*. Though the taste of the meat portions of the dried plankton and the dried small shrimp is similar, the *Euphausia superba* product has a slightly "harsh" taste which somewhat irritates the thoat when swallowed. Some people say *Euphausia superba* has some particular flavor more attractive than said small shrimp, but generally the taste of the whole body of *Euphausia superba* is so particularly rich as to be cloying and thus objectionable to many people. This fault is likely caused by the internal organs of this animal plankton such as liver, stomach, heart, ovary etc., particularly by the liver, all retained in the head-chest portion of the plankton body. Furthermore, since the liver of *Euphausia superba* has a particularly high content of oil and fat which is readily oxidized, the product quality soon deteriorates.

It is therefoe necessary or at least preferable to remove the liver, together with or without the head-chest portion, from the plankton body. In order to ensure that *Euphausia superba* is readily acceptable to many people as sea food, not only the head-chest portion but also the shell covering the tail-belly portion should preferably be removed from the meat portion of the plankton.

Hitherto, various methods have been proposed for removed the shell of lobster, prawn, shrimp and the like, among which only the freezing and crushing method is useful partically for the small shrimps such as *Sergestes lucens*. By that method, a mass of bodies of the small shrimp is subjected to quick freezing with each body being individually separated from others (so-called I.Q.F. method, i.e., "Individual Quick Freezing" method). Then the frozen bodies are charged into a pellet-shooting abrasion appraratus of the shot-peening or projection type which is usually used for abrasion cleaning of steel sheet, bolts, nuts and the like, so that the whole outer shell and the eyes, feelers, and legs attached to the head-chest portion as well as the inner organs contained therein, are readily crushed or disintegrated into pieces and powder, due to the high brittleness shown by the frozen body at the low temperature. Hence the resulting pieces and dusts may be separated from the meat of the tail-belly portion. This rather recently developed method can be efficiently applied particularly to the small shrimps such as *Sergestes lucens* to selectively separate a cleanly shucked meat portion from the shrimp body (see Japanese Patent No. 620,450).

This freezing and crushing method, however, cannot be applied as such to *Euphausia superba* to obtain similarly satisfactory results. The head-chest portion of this large-sized animal plankton contains internal organs, above all the liver, which are quite high in water, as well as retaining a considerable amount of vegetable planktons taken in as food; while all the inner organs and liver are covered with a thin meat layer which is, in turn, covered with a thick shell. Accordingly, the head-chest portion becomes very hard and stiff as a whole when the boiled body of *Euphausia superba* is frozen. Furthermore, unlike to the shrimp which has the gill portion contained in the body the head -chest portion, the gill portion is outwardly protruded from the plankton body under the head-chest portion, and it is apt to contain much water. Therefore, when the plankton body is frozen, said gill portion becomes very hard and stiff and is difficult to crush.

Even if the shot or pellets are projected at a higher speed and for a longer time to impinge against the frozen body of *Euphausia superba*, said head-chest and gill portions cannot be crushed as readily as those of the shrimp, but the meat portion itself present in the tail-belly portion of the frozen plankton body is damaged or disintegrated mechanically. Since the loss of meat entailed by this pellet-shooting operation is considerable and the characteristic beautiful pinkish color of the meat is deteriorated, this shell-removing method utilizing the high brittleness of the frozen body at the low temperature cannot be applied to *Euphausia superba* from the economical view point.

An object of the invention is, then, to provide an industrially applicable method fo processing an animal plankton *Euphausia superba* to recover a frozen and shucked meat of beautiful appearance and excellent taste.

Such object, and other objects which will be apparent from the following specification, can be attained by the method of the invention, which comprises fundamentally a first step of applying some force to a mass of raw bodies of *Euphausia superba* in such a way as to substantially remove the inner organs, and particularly the liver, from each body of the plankton but leave the meat portion retained in the shell.

The mass of bodies of *Euphausia superba*, which have by the fist step been freed from the inner organs, is then subjected successively to the second step of heating in water or sea water at such a temperature as to substantially thermally coagulate protein of the meat portion of the plankton to a "dewatering" third step of removing the juicy material contained in a gap formed between the shell and the thermally shrunk meat portion, to the fourth step of freezing the mass of bodies of *Euphausia superba* in such a condition that the plankton bodies are individually separate from each other and finally to the fifth step of projecting pellets against each of the frozen bodies of *Euphausia superba* held at a low temperture for maintaining brittleness of each plankton body. In this way, the fifth step of the presented method can be effectively carried out by ensuring that the shell, exposed gill portion, eyes feelers and legs are crushed or disintegrated and rendered easily removable from the remaining plankton body while leaving a mass of the meat portions undamaged. The mass of the meat portion then may easily be isolated from the pieces and powder of the shell, gill and other crushed or disintegrated parts.

The invention is based on the following discoveries and utilizing of the following biological characteristic peculiar to *Euphausia suberba*.

Generally, these large-sized animal planktons are caught by a large fishing vessel towing a middle layer trawl net, and the planktons so caught are cooked and frozen on board. These heating and freezing processes must be carried out as soon as possible after catching the plankton, because freshness of the plankton drops so fast that even four hours after catching *Euphausia superba* cannot be used as a raw material for processing into food.

The reason for this is that the inner organs, and above all the liver, in the head-chest portion of *Euphausia superba* are particularly readily ruptured and extruded out of the plankton body. When the mass of the planktons is piled up on board to a height 40cm or more, at the bottom of the pile the liver of each plankton is crushed and extruded merely by the overlying weight in the pile, so that yellow liver liquid exudes in which the bodies of the plankton are immersed. Since the enzyme activity of the *Euphausia superba* liver is quite strong, the meat is subjected to a degree of liquefacation by self-digestion and consequently the freshness of the meat is rapidly lowered. When the trawling net is towed without unloading for a long time, then due to forces produced by the net motion through the water, the inner organs, above all the liver, of each body of the animal planktons swept to the cod-end of the net might be partly crushed and extruded, but the other internal organs would still remain to produce the adverse effect referred to above.

This phenomenon is characteristic of *Euphausia superba* and cannot be observed in respect to the shrimps. It has been found that application to the plankton body of such a slight force, as one on the order of 40-140 g/cm$^2$, can result in crushing and extrusion of the fresh liver. The invention utilizes this particular characteristic. The force to extrude the inner organs from the plankton body may be applied in various ways. For instance, when fresh *Euphausia superba* is charged into and centrifuged in a basket-type centrifugal separator under a centrifugal force of about 1,000 G, the liver and the other inner organs are almost completely extruded, but the meat portion is left in the shell. It is also possible to apply the force to the plankton body by means of a press machine for attaining the same result. When the force is applied after the boiling operation, however, said inner organs inclusive of the liver, having been thermally coagulated, can be neither crushed nor extruded from of the body. The force, therefore, must be applied to raw *Euphausia superba* not yet heated. Of course, the liquid which has exuded from the plankton body and particularly from the liver should be washed out of the body, for instance by means of high pressure water spraying, before subjecting to the heating treatment.

The thermal denaturation of myosin protein, the major protein present in the meat portion of *Euphausia superba*, begins at about 40° C and is almost halted at a temperature ranging from 65° to 66° C. Albumin protein, a minor protein component, is almost completely thermally denaturized at a temperatue of 60° −68° C. The thermal denaturization of the protein materials present in the blood begins at about 70° C and is almost completed at 72°-74° C. The digestive enzyme in the liver has an optimum temperature ranging from 40° to 50° C for its enzymatic activity, and the activity is rapidly lowered as temperature rises above 55° C. at a temperature of 60° C the enzyme is almost deactivated, and at 65° C the activity is substantially completely nullified. For some enzymic proteins present in the blood of the plankton, the thermal denaturization temperature is quite high. Tyrosinase, an oxidative enzyme in the blood forms melanine from tyrosine thereby to blacken the meat of *Euphausia superba*. The activity of tyrosinase cannot be ignored at temperatures below 70° C. By heating at a temperature of about 78°-80° C, however, the blackening can be substantially prevented.

When heated to a temperature above 80° C, the meat is thermally shrunk to an excessive extent and the tasty exudate is lost from the meat tissue. Furthermore the tissue of the meat which has been heated at such high temperature is apt to be readily broken or loosened by growing ice crystals during the refrigeration storage, with the result that the meat is made spongy and upon thawing much tasty exudate is lost, so as to considerably deteriorate the product quality. Thus, the heating step is carried out to heat the meat to a temperature of higher than about 75° C at the center of the body, and more preferably to a temperature of from about 78° C to about 80° C and desirably to no higher than about 85° C.

The mass of heated bodies of *Euphausia superba* is cooled with sea water and subjected to the next, juicy material-removing step. When the meat is heated to about 80° C, the water content is reduced by 25% so that the meat shrinks considerably and pulls away from the inner wall of the shell to produce a gap therebetween. In that gap there is retained a juicy material which is preferably removed by any suitable means, lest it should adversely affect the next, shell-crushing step. For instance when the usual basket-type centrifugal separator is used for applying a centrifugal force of about 1,000 G to the mass of *Euphausia superba* charged therein, the removal of the juicy material can be almost perfectly achieved in a few minutes.

The mass of *Euphausia superba* is then subjected to the next step, the freezing step. This freezing treatment should not be effected by the usual block freezing, but must be conducted according to the so-called I.Q.F. method so that *Euphausia superba* may be quickly frozen with the plankton bodies separate, i.e., free of one another. the I.Q.F. method can be carried out, for instance, by moving the bodies of *Euphausia superaba* at random by agitation, and thereby separately subjecting each body to the freezing medium. Since the moisture adhering to the outer surface the plankton body has been removed in the preceding step, however, it is possible to attain substantially the same result as in the I.Q.F. method, even by using the usual air blast or semi-air blast freezing apparatus. Fora slight mixing or agitation is sufficient to release any adherence of the bodies arising by freezing. Even the contact freezer which is usually provided in most of the large trawler vessels can be utilized to freeze the plankton bodies substantially in the individually separateed condition, if the bodies of Euphausia superba are laid in a thin layer on each of the freezing trays.

The thus treated meat of Euphausia superba is frozen even at a temperature of about −2° to −4.5° C like to the shrimps, but in order to proceed with the freezing and crushing method for removing the shell, the meat temperature must be lowered down to about −35° C, and this is sufficient. When the freezing temperature is lowered below about −35° C, the shell and the head-chest portion become sufficiently brittle to be chrushed readily in the subsequent, pellet-shooting shelling or shucking step, while the meat is made tough enough not to be damaged during that operation.

The mass of the frozen Euphausia superba bodies is next charged into the abrading apparatus which is provided with a charge-receiving rotatable drum having many perforations in its circumferential wall, a nozzle for blowing the freezer medium into said drum, and a device for projecting pellets at a high speed in a determined direction to impinge against the frozen plankton bodies as the charge in the drum. As the material for the pellts, edibly harmless synthetic resins such as nylon, polyvinylidene chloride and the like are available. Light and soft plastics such as polyethylene are not desirable, since the impact force achievable by resin pellets of low density and low hardness is not sufficient to effectively crush or disintegrate the shell.

When the pellets are shot at a high speed 50-80 m/sec. to impinge against the charge of frozen Euphausia superba bodies tumbling at the drum bottom, each body is struck sharply so that the frozen and brittle shell, eyes, gill, feelers and legs are crushed or disintegrated into pieces and powder which escape with the pellets through the drum perforations, while the meat portions remain undamaged and are retained in the drum. Of course, the apparatus is kept at temperature below about −35° C. When the temperature of the frozen plankton body is of the order of −20° C, the shell cannot be sufficiently disintegrated nor removed but rather partially left on the body. When the pellet-shooting operation is continued too long, the meat itself can, undesirably, be damaged and the beautiful red color of the meat surface be lost.

The following Example is given merely as showning the satisfactory result achieved by an actual test, but without restricting the invention thereto.

EXAMPLE

A 10 Kg batch of ray but frozen bodies of Eupausia superba, used as the feed stock material for the test, was thawed and centrifuged for two minutes in a basket-type centrifugal separator developing a centrifugal force of about 1,000 G. The inner organs, inclusive of the liver, were almost completely extruded from each body of the plankton. The plankton material was then washed with water to remove the extruded inner organ from the remaining body portions, and the rinsed material was boiled in sea water to bring the inner part of the meat to a temperature of about 80° C. The heated material was then cooled with cold water and again centrifuged in the centrifugal separator for one minute to remove the juicy material which was retained in the gap between the shrunken meat portion and the outer shell. The head-chest portion of each plankton body was observed to have become thin and flat as a result of the removal of the inner organs. The shell, gill, eyes, legs and feelers still remained on each plankton body. The mass of Euphausia superba treated as above was charged into the perforated rotatable drum of the abrading apparatus. With a stream of liquid being blown into the rotating drum through the nozzle to reduce and keep the temperature of the Euphausia superba bodies at about −35° C, nylon pellets each 2.5mm in length and 2.5mm in diameter were shot into said drum at a speed of 50 m/sec. for three minutes to impinge against the frozen plankton bodies tumbling within the rotating the drum. The frozen shell, gill, eyes, legs and feelers were wholly disintegrated into small pieces and powder, and centrifugally separated from the undamaged meat portion of the plankton.

The shucked meat of the large-sized animal planktons was thus separated to yield 1.5 kg. of a characteristically beautiful pink-colored and stripe-pattern shucked meat which retained a good taste like to that of the small shrimp.

We claim:

1. A method for processing the animal plankton Euphausia superba to an edible food form acceptable for human consumption comprising the steps of:

applying force to a mass of raw unfrozen bodies of Euphausia superba in such a way as to substantially remove internal organs, especially the liver, from each body of the plankton but to leave the meat portion retained in the shell;

heating the mass of said bodies after removal of internal organs, in water at such a temperature as to substantially thermally coagulate protein of the meat portion of the plankton;

removing a liquid material contained in a gap formed between the shell and the thermally shrunk meat portion;

freezing the mass of the said bodies so treated in such a condition that the bodies are free of each other; and projecting pellets against the frozen bodies held at a low temperature for keeping each body brittle, thereby to crush and remove the shell, exposed gill portion, eyes, feelers and legs from the remaining meat portion of the body, whereby a mass of the meat portions may be isolated undamaged.

2. The method as described in claim 1, in which said force is applied by means of a centrifugal separator.

3. The method as described in claim 1, in which said force is applied by means of a press machine.

4. The method as described in claim 1, in which the heating step is carried out to bring the center of the meat portion to a temperature of higher than about 75° C, and more preferably to a temperature of from about 78° C to about 80° C.

5. The method as described in claim 1, in which the freezing step and the pellet-shooting step are each carried out with the said mass at a temperature of about −35° C.

6. The method as described in claim 1, wherein the heating step is carried out in boiling water until the interiors of the said meat portions reach a temperature of from about 75° C to about 85° C, preferably to a temperature of from about 78° C to about 80° C.

7. The method as described in claim 1, wherein the said mass of raw bodies, next after the force application, is subjected to action of high pressure water spray to carry away internal organ material removed, by the force application, from the bodies.

* * * * *